United States Patent
Xia et al.

(10) Patent No.: US 12,267,195 B2
(45) Date of Patent: Apr. 1, 2025

(54) SYSTEM AND METHOD FOR REDUCING POWER CONSUMPTION USING POWER SAVING REFERENCE SIGNALS

(71) Applicant: Huawei Technologies Co., Ltd., Shenzhen (CN)

(72) Inventors: Pengfei Xia, San Diego, CA (US); Young Hoon Kwon, Laguna Niguel, CA (US); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 606 days.

(21) Appl. No.: 17/279,816

(22) PCT Filed: Apr. 29, 2019

(86) PCT No.: PCT/CN2019/084904
§ 371 (c)(1),
(2) Date: Mar. 25, 2021

(87) PCT Pub. No.: WO2020/069641
PCT Pub. Date: Apr. 9, 2020

(65) Prior Publication Data
US 2021/0399934 A1    Dec. 23, 2021

Related U.S. Application Data

(60) Provisional application No. 62/808,490, filed on Feb. 21, 2019, provisional application No. 62/740,118, filed on Oct. 2, 2018.

(51) Int. Cl.
*H04L 27/26* (2006.01)
*H04L 5/00* (2006.01)
(Continued)

(52) U.S. Cl.
CPC ...... *H04L 27/26025* (2021.01); *H04L 5/0048* (2013.01); *H04L 5/0064* (2013.01);
(Continued)

(58) Field of Classification Search
None
See application file for complete search history.

(56) References Cited

U.S. PATENT DOCUMENTS 10,117,217 B2    10/2018   Kim et al.
10,389,568 B1 *   8/2019   Shattil ............... H04L 5/0035
(Continued)

FOREIGN PATENT DOCUMENTS

CN    102185685 A    9/2011
CN    103312656 A    9/2013
(Continued)

*Primary Examiner* — Andrew C Oh
(74) *Attorney, Agent, or Firm* — Slater Matsil, LLP

(57) ABSTRACT

A computer-implemented method for operating a receiving device includes receiving a configuration for a first signal, wherein the first signal is configured for transmission in a first subcarrier spacing, wherein symbols of the first signal are each repeated an integer number of times, and wherein the integer number is equal to a ratio of a second subcarrier spacing to the first subcarrier spacing, and receiving the first signal in accordance with the second subcarrier spacing.

21 Claims, 7 Drawing Sheets

(51) Int. Cl.
*H04W 52/02* (2009.01)
*H04W 76/28* (2018.01)

(52) U.S. Cl.
CPC ....... *H04L 5/0092* (2013.01); *H04W 52/0229* (2013.01); *H04W 76/28* (2018.02)

(56) References Cited

U.S. PATENT DOCUMENTS

| | | | | |
|---|---|---|---|---|
| 10,917,221 | B2* | 2/2021 | Nakamura | H04L 5/0094 |
| 2006/0022803 | A1* | 2/2006 | Akiyama | G06K 19/0723 |
| | | | | 455/39 |
| 2006/0192537 | A1* | 8/2006 | Hagen | G05F 1/70 |
| | | | | 323/222 |
| 2007/0208579 | A1* | 9/2007 | Peterson | G06Q 30/016 |
| | | | | 379/71 |
| 2008/0043861 | A1* | 2/2008 | Moffatt | H04L 27/2618 |
| | | | | 375/260 |
| 2009/0245083 | A1* | 10/2009 | Hamzeh | H03M 13/356 |
| | | | | 370/204 |
| 2010/0254433 | A1* | 10/2010 | Azizi | H04L 5/0007 |
| | | | | 375/141 |
| 2012/0314591 | A1* | 12/2012 | Zhang | H04L 27/266 |
| | | | | 370/252 |
| 2013/0034066 | A1* | 2/2013 | Kakishima | H04L 27/2613 |
| | | | | 370/329 |
| 2014/0133413 | A1* | 5/2014 | Kim | H04L 27/2657 |
| | | | | 370/329 |
| 2015/0049642 | A1* | 2/2015 | Eng | H04L 5/0028 |
| | | | | 370/254 |
| 2016/0043890 | A1* | 2/2016 | Simon | H04L 27/2627 |
| | | | | 375/260 |
| 2016/0174213 | A1* | 6/2016 | Webb | H04W 52/146 |
| | | | | 370/336 |
| 2016/0285599 | A1* | 9/2016 | Shahar | H04L 5/0048 |
| 2017/0311315 | A1* | 10/2017 | Islam | H04L 27/2666 |
| 2017/0339697 | A1* | 11/2017 | Park | H04L 5/0044 |
| 2018/0048436 | A1* | 2/2018 | Park | H04W 52/146 |
| 2018/0054800 | A1* | 2/2018 | Yeo | H04W 74/002 |
| 2018/0070192 | A1* | 3/2018 | Lee | H04L 27/2626 |
| 2018/0131426 | A1* | 5/2018 | Lee | H04B 7/088 |
| 2018/0279152 | A1* | 9/2018 | Kim | H04W 24/10 |
| 2018/0279360 | A1* | 9/2018 | Park | H04W 72/23 |
| 2018/0324804 | A1* | 11/2018 | Aiba | H04L 27/26025 |
| 2019/0081843 | A1* | 3/2019 | Vaze | H04L 5/0053 |
| 2019/0238256 | A1* | 8/2019 | Xing | H04L 1/0017 |
| 2019/0313406 | A1* | 10/2019 | Liu | H04W 72/04 |
| 2019/0320397 | A1* | 10/2019 | Tang | H04W 56/0065 |
| 2020/0008228 | A1* | 1/2020 | Lee | H04W 72/21 |
| 2020/0028643 | A1* | 1/2020 | Kim | H04L 5/0048 |
| 2020/0028647 | A1* | 1/2020 | Kim | H04L 5/00 |
| 2020/0037308 | A1* | 1/2020 | Liu | H04L 5/0051 |
| 2020/0052848 | A1* | 2/2020 | Gao | H04W 72/046 |
| 2020/0092065 | A1* | 3/2020 | Kuang | H04L 27/2666 |
| 2020/0128578 | A1* | 4/2020 | Park | H04L 1/1812 |
| 2020/0169440 | A1* | 5/2020 | Thomas | H04L 27/26025 |
| 2020/0245395 | A1* | 7/2020 | Zhang | H04W 76/19 |
| 2021/0092697 | A1* | 3/2021 | Harada | H04L 5/0044 |
| 2021/0288853 | A1* | 9/2021 | Sundberg | H04W 72/0446 |
| 2021/0307037 | A1* | 9/2021 | Okamura | H04W 72/1268 |

FOREIGN PATENT DOCUMENTS

| | | | | |
|---|---|---|---|---|
| CN | 106376050 | A | 2/2017 | |
| EP | 1220505 | A2 * | 7/2002 | ......... H04L 27/2657 |
| EP | 3682706 | B1 * | 12/2023 | ......... H04W 28/26 |
| WO | WO-2009019064 | A1 * | 2/2009 | ......... H04L 5/0051 |
| WO | 2016093662 | A1 | 6/2016 | |
| WO | WO-2016186998 | A1 * | 11/2016 | ............... G01S 3/74 |
| WO | 2017200840 | A2 | 11/2017 | |
| WO | 2018027705 | A1 | 2/2018 | |
| WO | 2018081172 | A1 | 5/2018 | |
| WO | WO-2018115205 | A2 * | 6/2018 | ....... H04L 27/26025 |
| WO | WO-2018117139 | A1 * | 6/2018 | ............... H04L 1/08 |
| WO | WO-2018121863 | A1 * | 7/2018 | ............... H04B 1/0078 |
| WO | WO-2018200577 | A1 * | 11/2018 | ........... H04L 1/0003 |
| WO | WO-2019031864 | A1 * | 2/2019 | ............. H04B 1/713 |
| WO | WO-2019220595 | A1 * | 11/2019 | |

* cited by examiner

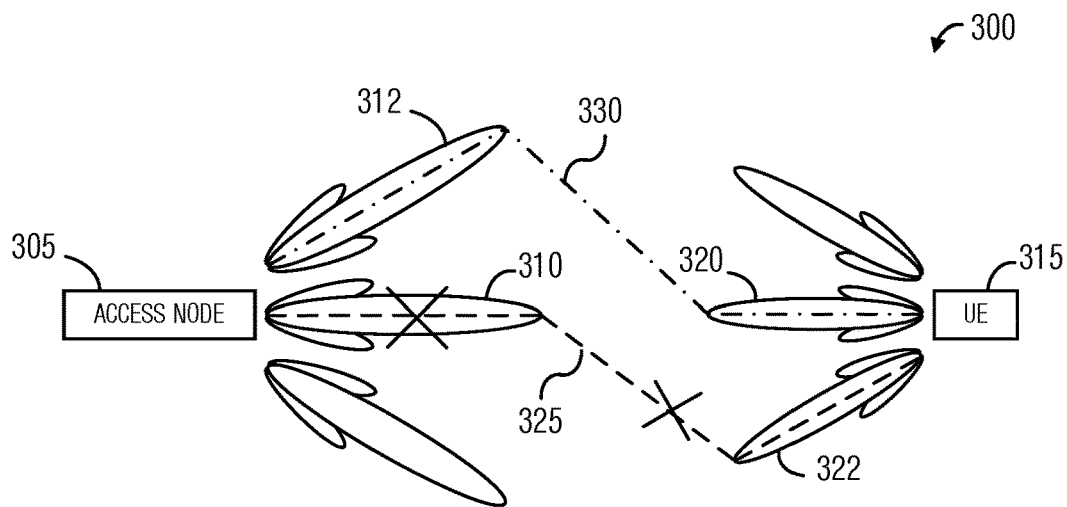
*Fig. 3*
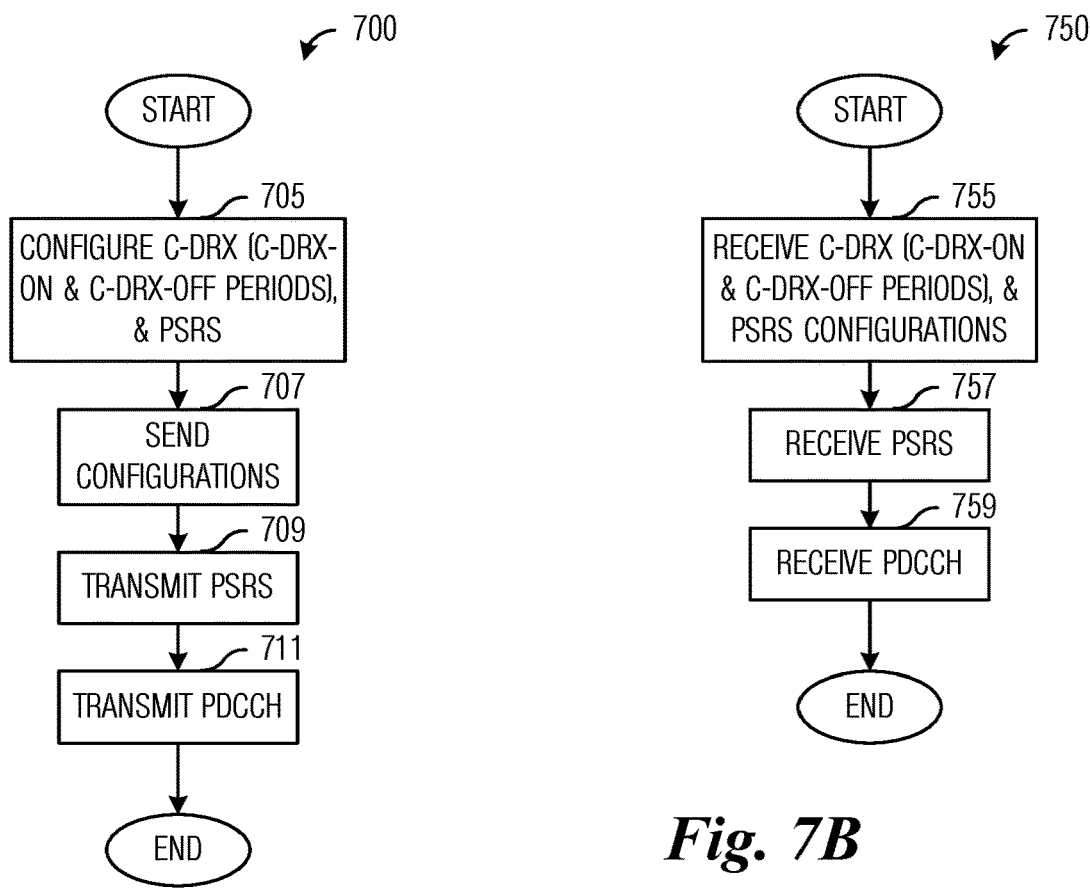
*Fig. 7A*
*Fig. 7B*

SYSTEM AND METHOD FOR REDUCING POWER CONSUMPTION USING POWER SAVING REFERENCE SIGNALS

PRIORITY CLAIM AND CROSS-REFERENCE

This application is a national phase filing under section 371 of PCT/CN2019/084904, filed Apr. 29, 2019, which claims the benefit of U.S. Provisional Application No. 62/740,118, filed on Oct. 2, 2018, entitled "System and Method for Reducing Power Consumption Using Power Saving Reference Signals" and U.S. Provisional Application No. 62/808,490, filed on Feb. 21, 2019, entitled "System and Method for Reducing Power Consumption Using Power Saving Reference Signals," each of which is incorporated herein by reference in its entirety.

TECHNICAL FIELD

The present disclosure relates generally to a system and method for digital communications, and, in particular embodiments, to a system and method for reducing power consumption using power saving reference signals.

BACKGROUND

Discontinuous reception (DRX) operation is a technique used to help improve power savings in wireless communications devices. DRX operation comprises two of time periods: DRX-on and DRX-off. In a DRX-on period, a wireless communications device is actively detecting for signals intended for the wireless communications device, while in a DRX-off period, there are no signals intended for the wireless communications device and the wireless communications device can enter a power saving mode (the power saving mode is commonly referred to as a sleep mode, a sleep state, a reduced power mode, and so on), consuming very little power.

Although DRX operation results in power savings, communications system designers are continuing work in developing additional ways for achieving power savings.

SUMMARY

According to a first aspect, a computer-implemented method for operating a receiving device (RD) is provided. The method includes receiving, by the RD, a configuration for a first signal, wherein the first signal is configured for transmission in a first subcarrier spacing, wherein symbols of the first signal are each repeated an integer number of times, and wherein the integer number is equal to a ratio of a second subcarrier spacing to the first subcarrier spacing, and receiving, by the RD, the first signal in accordance with the second subcarrier spacing.

In a first implementation form of the computer-implemented method according to the first aspect as such, wherein receiving the first signal in accordance with the second subcarrier spacing comprises receiving the first signal with a second sampling clock associated with the second subcarrier spacing, wherein the second sampling clock is slower than a first sampling clock associated with the first subcarrier spacing.

In a second implementation form of the computer-implemented method according to the first aspect as such or any preceding implementation form of the first aspect, wherein receiving the first signal in accordance with the second subcarrier spacing comprises receiving the first signal with a second Fourier Transform size associated with the second subcarrier spacing, wherein the second Fourier Transform size is smaller than a first Fourier Transform size associated with the first subcarrier spacing.

In a third implementation form of the computer-implemented method according to the first aspect as such or any preceding implementation form of the first aspect, wherein receiving the first signal in accordance with the second subcarrier spacing comprises receiving the first signal with the second subcarrier spacing, wherein the second subcarrier spacing is different than the first subcarrier spacing.

In a fourth implementation form of the computer-implemented method according to the first aspect as such or any preceding implementation form of the first aspect, wherein the integer number is greater than or equal to two.

In a fifth implementation form of the computer-implemented method according to the first aspect as such or any preceding implementation form of the first aspect, wherein the first signal is received in accordance with the second subcarrier spacing when power consumption by the UE is a consideration.

In a sixth implementation form of the computer-implemented method according to the first aspect as such or any preceding implementation form of the first aspect, further comprising receiving, by the RD, a configuration for a second signal, wherein the second signal is configured for transmission in the first subcarrier spacing, and wherein symbols of the second signal are each repeated the integer number of times, and receiving, by the RD, the second signal in accordance with the first subcarrier spacing.

In a seventh implementation form of the computer-implemented method according to the first aspect as such or any preceding implementation form of the first aspect, wherein the second signal is received in accordance with the first spacing when power consumption by the UE is not a consideration.

In an eighth implementation form of the computer-implemented method according to the first aspect as such or any preceding implementation form of the first aspect, wherein the first signal and the second signal are the same.

In a ninth implementation form of the computer-implemented method according to the first aspect as such or any preceding implementation form of the first aspect, further comprising receiving, by the RD, a control channel in accordance with a third subcarrier spacing that is smaller than the second subcarrier spacing.

In a tenth implementation form of the computer-implemented method according to the first aspect as such or any preceding implementation form of the first aspect, further comprising receiving, by the RD, a data channel in accordance with a fourth subcarrier spacing that is different from the third subcarrier spacing.

In an eleventh implementation form of the computer-implemented method according to the first aspect as such or any preceding implementation form of the first aspect, wherein the control channel is a physical downlink control channel (PDCCH) and the data channel is a physical downlink shared channel (PDSCH).

In a twelfth implementation form of the computer-implemented method according to the first aspect as such or any preceding implementation form of the first aspect, wherein the signal is a power saving reference signal (PSRS).

According to a second aspect, a computer-implemented method for operating a transmitting device (TD) is provided. The method includes transmitting, by the TD, a configuration for a signal, wherein the signal is configured for transmission in a first subcarrier spacing, wherein symbols of the signal are each repeated an integer number of times, and wherein the integer number is equal to a ratio of a second subcarrier spacing to the first subcarrier spacing, and transmitting, by the TD, the signal.

In a first implementation form of the computer-implemented method according to the second aspect as such, further comprising transmitting, by the TD, a control channel in accordance with a third subcarrier spacing that is smaller than the second subcarrier spacing.

In a second implementation form of the computer-implemented method according to the second aspect as such or any preceding implementation form of the second aspect, wherein there is a time gap between transmitting the signal and transmitting the control channel.

In a third implementation form of the computer-implemented method according to the second aspect as such or any preceding implementation form of the second aspect, further comprising transmitting, by the access node, a data channel in accordance with a fourth subcarrier spacing that is different from the third subcarrier spacing.

In a fourth implementation form of the computer-implemented method according to the second aspect as such or any preceding implementation form of the second aspect, wherein the control channel is a PDCCH and the data channel is a PDSCH.

In a fifth implementation form of the computer-implemented method according to the second aspect as such or any preceding implementation form of the second aspect, wherein the signal is a PSRS.

According to a third aspect, a receiving device is provided. The receiving device includes a non-transitory memory storage comprising instructions, and one or more processors in communication with the memory storage. The one or more processors execute the instructions to receive a configuration for a first signal, wherein the first signal is configured for transmission in a first subcarrier spacing, wherein symbols of the first signal are each repeated an integer number of times, and wherein the integer number is equal to a ratio of a second subcarrier spacing to the first subcarrier spacing, and receive the first signal in accordance with the second subcarrier spacing.

In a first implementation form of the receiving device according to the third aspect as such, wherein the one or more processors further execute the instructions to receive the first signal with a second sampling clock associated with the second subcarrier spacing, wherein the second sampling clock is slower than a first sampling clock associated with the first subcarrier spacing.

In a second implementation form of the receiving device according to the third aspect as such or any preceding implementation form of the third aspect, wherein the one or more processors further execute the instructions to receive the first signal with a second Fourier Transform size associated with the second subcarrier spacing, wherein the second Fourier Transform size is smaller than a first Fourier Transform size associated with the first subcarrier spacing.

In a third implementation form of the receiving device according to the third aspect as such or any preceding implementation form of the third aspect, wherein the one or more processors further execute the instructions to receive the first signal with the second subcarrier spacing, wherein the second subcarrier spacing is larger than the first subcarrier spacing.

In a fourth implementation form of the receiving device according to the third aspect as such or any preceding implementation form of the third aspect, wherein the integer number is greater than or equal to two.

In a fifth implementation form of the receiving device according to the third aspect as such or any preceding implementation form of the third aspect, wherein the first signal is received in accordance with the second subcarrier spacing when power consumption by the UE is a consideration.

In a sixth implementation form of the receiving device according to the third aspect as such or any preceding implementation form of the third aspect, wherein the one or more processors further execute the instructions to receive a configuration for a second signal, wherein the second signal is configured for transmission in the first subcarrier spacing, and wherein symbols of the second signal are each repeated the integer number of times, and receive the second signal in accordance with the first subcarrier spacing.

In a seventh implementation form of the receiving device according to the third aspect as such or any preceding implementation form of the third aspect, wherein the second signal is received in accordance with the first subcarrier spacing when power consumption by the UE is not a consideration.

In an eighth implementation form of the receiving device according to the third aspect as such or any preceding implementation form of the third aspect, wherein the first signal and the second signal are the same.

In a ninth implementation form of the receiving device according to the third aspect as such or any preceding implementation form of the third aspect, wherein the one or more processors further execute the instructions to receive a control channel in accordance with a third subcarrier spacing that is smaller than the second subcarrier spacing.

In a tenth implementation form of the receiving device according to the third aspect as such or any preceding implementation form of the third aspect, wherein the one or more processors further execute the instructions to receive a data channel in accordance with a fourth subcarrier spacing that is different from the third subcarrier spacing.

According to a fourth aspect, a transmitting device is provided. The transmitting device includes a non-transitory memory storage comprising instructions, and one or more processors in communication with the memory storage. The one or more processors execute the instructions to transmit a configuration for a signal, wherein the signal is configured for transmission in a first subcarrier spacing, wherein symbols of the signal are each repeated an integer number of times, and wherein the integer number is equal to a ratio of a second subcarrier spacing to the first subcarrier spacing, and transmit the signal.

In a first implementation form of the transmitting device according to the fourth aspect as such, wherein the one or more processors further execute the instructions to transmit a control channel in accordance with a third subcarrier spacing that is smaller than the second subcarrier spacing.

In a second implementation form of the transmitting device according to the fourth aspect as such or any preceding implementation form of the fourth aspect, wherein there is a time gap between transmitting the signal and transmitting the control channel.

In a third implementation form of the transmitting device according to the fourth aspect as such or any preceding implementation form of the fourth aspect, wherein the one or more processors further execute the instructions to transmit a data channel in accordance with a fourth subcarrier spacing that is different from the third subcarrier spacing.

In a fourth implementation form of the transmitting device according to the fourth aspect as such or any preceding implementation form of the fourth aspect, wherein the control channel is a PDCCH and the data channel is a PDSCH.

An advantage of a preferred embodiment is that the power consumption associated with monitoring reference signals is reduced, thereby reducing the overall power consumption of a communications device.

Yet another advantage of a preferred embodiment is that a device receiving the reference signals has flexibility in subcarrier spacing used to receive the reference signals, choosing to save power or not.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a wireless communications system highlighting beam failure and beam failure recovery;

FIG. 7A illustrates a flow diagram of example operations occurring in an access node configuring and transmitting PSRSs for reduced power consumption according to example embodiments presented herein;

FIG. 7B illustrates a flow diagram of example operations occurring in a UE receiving PSRSs and PDCCHs with reduced power consumption according to example embodiments presented herein;

DETAILED DESCRIPTION OF ILLUSTRATIVE EMBODIMENTS

The making and using of the disclosed embodiments are discussed in detail below. It should be appreciated, however, that the present disclosure provides many applicable concepts that can be embodied in a wide variety of specific contexts. The specific embodiments discussed are merely illustrative of specific ways to make and use the embodiments, and do not limit the scope of the disclosure.

Figure 1:
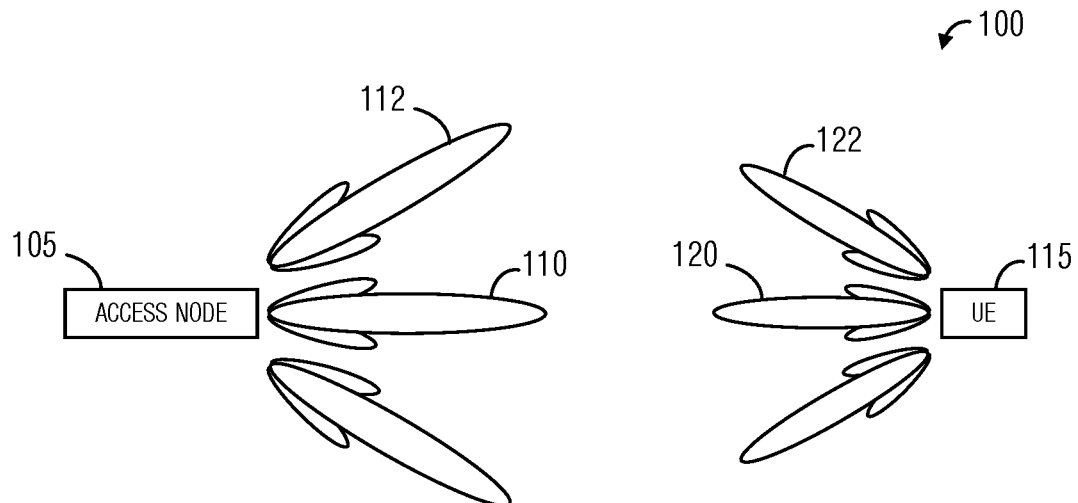
FIG. 1 an example communications system.

FIG. 1 illustrates an example communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
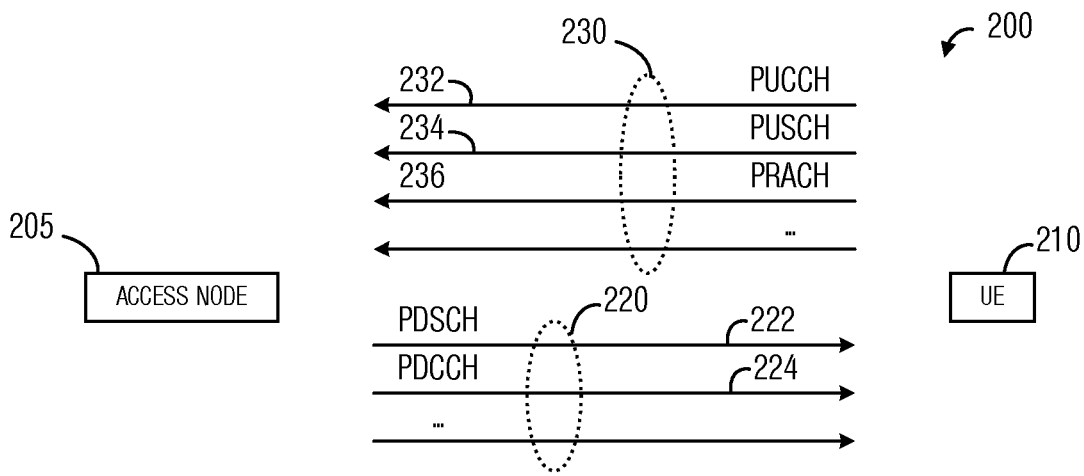
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi collocated (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

Objectives of the 3GPP Release 15 further enhanced machine type communications (efeMTC) Work Item (WI) include:

Power consumption reduction for physical channels;
Study and (if found beneficial for idle mode paging or connected mode discontinuous reception (C-DRX)) specify physical signal or channel that can be efficiently decoded or detected prior to decoding the physical downlink control or data channel.
Study of the above objective has resulted in a Wake-up Signal and corresponding work in 3GPP Radio Access Network 1 (RAN1) or 3GPP RAN2 task groups are nearing completion. The 3GPP Release 15 machine type communications (MTC) WI was extended and an exception was approved that includes objectives: Wake-up signaling for idle-mode paging; and Minimum reception requirements for wake-up signals.

In co-assigned PCT application number PCT/US18/52355, entitled "System and Method for Power Saving in Discontinuous Reception Operation," filed Sep. 24, 2018, which is hereby incorporated herein by reference, a reference signal usable for achieving power saving at a UE is disclosed. The reference signal is transmitted during a C-DRX cycle. This reference signal may be referred to as a power saving reference signal (PSRS) and is spatially QCL'ed with the PDCCH (or a reference signal associated with the PDCCH, such as a demodulation reference signal (DMRS) of the PDCCH) to be received. The PSRS provides a way for a UE that is entering into a C-DRX period to confirm the beam quality of beam on which a physical downlink control channel (PDCCH) will be carried meets a criterion for successful signal reception or not. Additionally, in some embodiments, depending on PSRS reception quality, the UE can selectively perform PDCCH reception. In an embodiment, if the PSRS reception quality meets a first threshold, the UE proceeds to search for and receive a PDCCH, while if the PSRS reception quality does not meet the first threshold, the UE skips searching for a PDCCH. In another embodiment, if the PSRS reception quality meets a second threshold, the UE stops searching for a PDCCH, while if the PSRS reception quality does not meet the second threshold, the UE continues searching and receiving a PDCCH.

Figure 4:
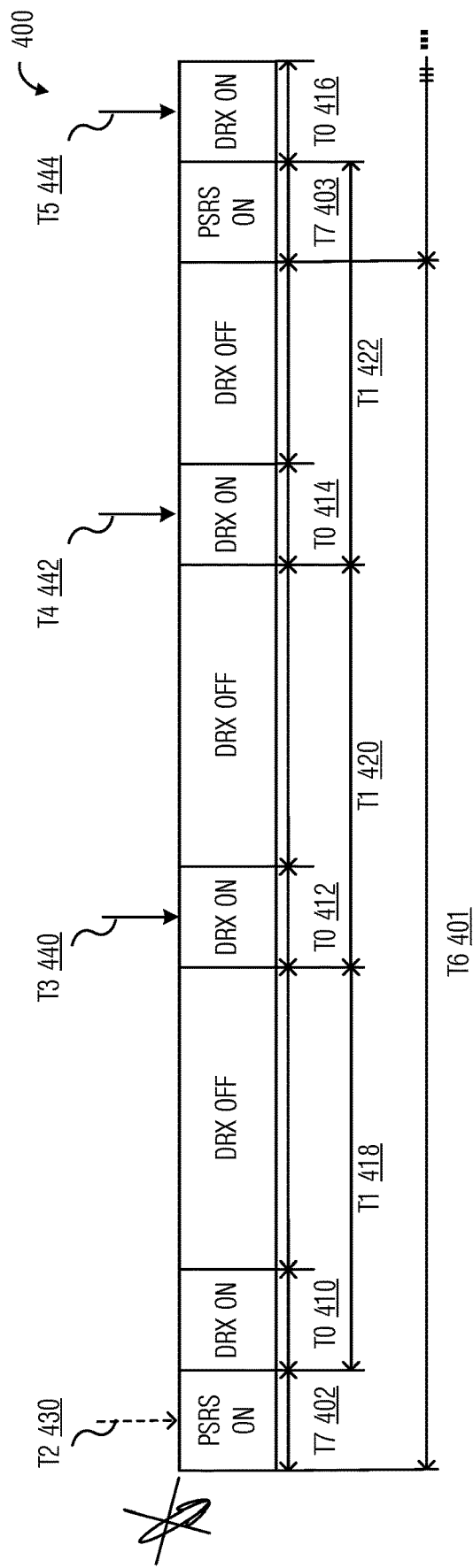
FIG. 4 illustrates a diagram highlighting a technique utilizing a PSRS to ensure that a beam between access node and UE is intact.

FIG. 4 illustrates a diagram 400 highlighting a technique utilizing a PSRS to ensure that a beam between access node and UE is intact. The PSRS may be sent in a PSRS-ON period (T7 402 and 403, for example). During the PSRS-ON period, the UE is expected to wake up and monitor a reference signal quality of the PSRS. Examples of the reference signal quality include received signal power, reference signal received power (RSRP), reference signal received quality (RSRQ), signal to noise ratio (SNR), signal plus interference to noise ratio (SINR), block error rate (BLER), and so on. As shown in FIG. 4, the PSRS has a recurring periodicity of T6 401. However, the PSRS may be aperiodic. The position of each PSRS-ON period (e.g., T7 402 and 403), as well as associated starting and stopping positions, duration, and periodicity, of the PSRS may be configured by the access node. The PSRS-ON periods may or may not occur immediately before or after DRX-ON (such as T0 410, 412, 414, and 416) or DRX-OFF periods. Additionally, the PSRS-ON periods and the DRX-ON periods may overlap. Furthermore, a PSRS-ON period may be fully contained within a DRX-ON period or a DRX-ON period may be fully contained within a PSRS-ON period. Also, a PSRS-ON period and a DRX-ON period may be disjoint, and share no time in common. Also, one PSRS-ON period T7 402 may be followed by one (not illustrated in FIG. 4) or several (illustrated in FIG. 4) DRX-ON periods (such as T0 410, 412, and 414) until the next PSRS-ON period T7 403.

In general, a PSRS (or a PSRS-ON period) is associated with one or more DRX-ON periods. A PSRS (or a PSRS-ON period) is associated with the one or more DRX-ON periods that occur between consecutive PSRSs (or PSRS-ON periods), for example. As an example, DRX-ON periods T0 410, 412, and 414, are associated with PSRS-ON period at time T7 402 or the BQRS transmitted therein.

The specifics of the PSRS-ON period (e.g., starting or ending positions in time or frequency, and duration) may be different from the specifics of the DRX-ON period, as illustrated in FIG. 4. The PSRS recurring periodicity may be different from the DRX recurring periodicity, as illustrated in FIG. 4, where three DRX periods T1 418, 420, 422 occur within a single PSRS period T6 401. However, they may be the same. Within each PSRS-ON period, there may be one or multiple PSRS configured.

As shown in FIG. 4, a PSRS period may be merged with a DRX-ON period. The PSRS and the PDCCH (or a reference signal associated with the PDCCH) transmitted in an associated DRX-ON period should have a spatial QCL relationship. Although FIG. 4 and the discussion of FIG. 4 utilize DRX instead of C-DRX terminology, DRX and C-DRX terminology are interchangeable for the purposes of this discussion.

For evaluation purposes, a power consumption model is provided. The power consumption model includes:
  For PDCCH reception, expected power consumption is 150 power units per symbol; and
  For PSRS reception, expected power consumption is 100 power units per symbol;
  The expected power consumption values take into account power consumption of radio frequency (RF) and baseband circuitry. The expected power consumption values are drawn from practical implementations and may be considered to be typical values in practice.
  Although power savings may be achieved by reducing the number of PDCCH search occasions, the reception of PSRSs consume significant power as well (although less than the power consumption of PDCCH reception).

As an example, consider a system with 1000 DRX-ON cycles in total, with 200 DRX-ON cycles including a PDCCH (with 10 percent from audio or video streams and 30 percent from Internet traffic, and thus an average of 20 percent for half audio or video streams and half internet traffic). If the number of PSRS symbols NS is equal to the number of PDCCH symbols NC=2, then before the introduction of the PSRS, power consumption is $1000*150*NC=300,000$ power units per symbol; and after the introduction of the PSRS, power consumption is $1000*100*NS+200*150*NC=260,000$ power units per symbol. This leads to an overall power savings of 13%, which is significant, but not a huge reduction. Therefore, there is a need for systems and methods for reducing power consumption using PSRSs even further.

In communications systems supporting orthogonal frequency division multiplexing (OFDM) communications, the symbol duration is inversely proportional to the subcarrier spacing or the subcarrier bandwidth. Subcarrier spacing is the distance (in Hz) between two adjacent subcarriers and is a description of the bandwidth of the subcarriers. As an example, subcarriers with a small subcarrier spacing will have small bandwidths, while subcarriers with a large subcarrier spacing will have large bandwidths. As an example, an symbol in a subcarrier with a 15 KHz subcarrier spacing or 15 KHz subcarrier spacing would have an symbol duration that is twice as long as the symbol in a subcarrier with a 30 KHz subcarrier spacing. Similarly, a 15 KHz symbol would have a symbol duration that is 8 times greater than that of a 120 KHz symbol. Furthermore, power consumption is usually expressed at a rate of units per symbol (units/symbol). Hence, reducing the symbol duration of a signal (such as a reference signal (e.g., a PSRS or other reference signals)) would reduce power consumption associated with receiving the signal.

According to an example embodiment, a first reference signal is sent using different subcarrier spacing than what is used for a second reference or information signal. As an example, the PSRS is sent using a different subcarrier spacing used for the PDCCH, where the PSRS is sent in a subcarrier with wider subcarrier spacing than a subcarrier used for sending the PDCCH. Therefore, the symbol duration of the PSRS symbols would be less than the symbol duration of the PDCCH symbols, thereby leading to a reduction in the power consumption associated with PSRS detection. PSRSs may be a good candidate for reducing power consumption by increasing the subcarrier spacing because the PSRS can use a larger subcarrier spacing and thus, have a smaller symbol duration. A small time gap may be present to allow for the subcarrier spacing change between the PSRS and the PDCCH or C-DRX. Although the discussion focuses on using a different subcarrier spacing for the PSRS, the example embodiments presented herein are operable for other signals (e.g., a physical downlink shared channel (PDSCH)), as well as other transmissions, such as control signals or data signals. Furthermore, the discussion presented herein focuses on downlink transmissions. However, the example embodiments presented are also operable for uplink signals. Therefore, the discussion of the PSRS and the downlink transmissions should not be construed as being limiting to the scope or spirit of the example embodiments.

In addition to the power consumption reduction due to the shorter symbol duration, additional power consumption optimization may be achieved by using a lower sampling clock, smaller Fourier Transform (such as Fast Fourier Transform (FFT)) size, and so forth.

The restriction that adjacent symbols to be equal in the frequency domain (arising from the repetition of symbols in the frequency domain) may lead to performance degradation. One way to avoid this is to utilize high frequency (such as 6 gigahertz (GHz) channel frequencies and above, including 28 GHz millimeter wavelength (mmWave) channel frequencies) in the FR2 where channel frequency selectivity is relatively low. In such a situation, the repetition of the symbols may be viewed as a sparse or a sparser sampling of the flat channel in the frequency domain. This could potentially lead to a smaller performance degradation. As an example, a reference signal S1 may be used the FR1 and then a smoothed version of S1 is used in the FR2.

As discussed previously, reducing the symbol duration will result in a reduction in power consumption. Hence, the reception of any signal transmitted in accordance with the example embodiments presented herein will realize a reduction in power consumption. As an example, consider a system with 1000 DRX-ON cycles in total, with 200 DRX-ON cycles including a PDCCH (with 10 percent from audio or video streams and 30 percent from Internet traffic). If the number of PSRS symbols NS is equal to the number of PDCCH symbols NC=2, then before the introduction of PSRS, power consumption is $1000*150*NC=300,000$ power units per symbol; and after the introduction of half-symbol PSRS, power consumption is $0.5*1000*100*NS+200*150*NC=160,000$ power units per symbol. This leads to an overall power savings of 47%, which is more significant than the previous power savings example.

According to an example embodiment, symbol repetition in the frequency domain enables the transmission and reception of signals with different subcarrier spacings. The transmission of symbols with a first subcarrier spacing and an integer number of repetitions of the symbols in the frequency domain allows for the reception of the symbols with the first subcarrier spacing and a second subcarrier spacing, where the second subcarrier spacing is equal to the integer number times the first subcarrier spacing. As an example, if second subcarrier spacing is three times the first subcarrier spacing, then the symbols are transmitted a total of three times (one transmission of the symbols and two repetitions of the symbols).

Figure 5:
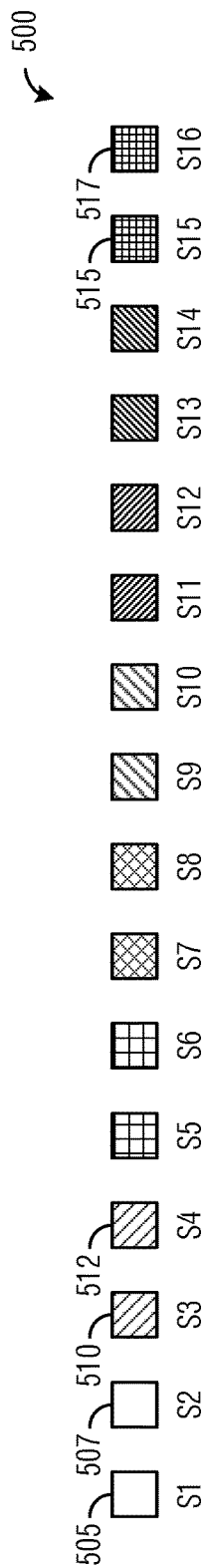
FIG. 5 illustrates a diagram of symbol transmissions in different subcarriers according to example embodiments presented herein.

As an illustrative example, consider a communications system that supports two subcarrier spacings: 15 KHz and 30 KHz. In this illustrative example, the second subcarrier spacing is two times the first subcarrier spacing, hence the symbols are transmitted a total of two times (one transmission of the symbols and one repetitions of the symbols). In the communications system, a transmitting device, such as an access node, transmits reference signals, such as a PSRS, with the 15 KHz subcarrier spacing. The transmission of the reference signals with the 15 KHz subcarrier spacing will enable a receiving device, such as a UE, to receive the reference signal if it also chooses to use the 15 KHz subcarrier spacing. FIG. 5 illustrates a diagram 500 of symbol transmissions in different subcarriers. As shown in FIG. 5, a first symbol 505 is transmitted in a first subcarrier S1, a second symbol 510 is transmitted in a second subcarrier S2, and so on, up to an eighth symbol 515 is transmitted in an eighth subcarrier S15.

In addition to transmitting the symbols in their respective subcarriers, the transmitting device also transmits repetitions of the symbols in other respective subcarriers. As discussed previously, the number of repetitions of each symbol in the frequency domain is a function of a ratio of the two respective subcarrier spacings. As an illustrative example, if the ratio is equal to two, each symbol is repeated one time in the frequency domain (which when included with the original transmission of the symbol, results in two instances of the symbol being present in the frequency domain), while if the ratio is equal to four, each symbol is repeated three times in the frequency domain (which when included with the original transmission of the symbol, results in four instances of the symbol being present in the frequency domain). As shown in FIG. 5, a repetition of first symbol 505 (denoted first repeated symbol 507) is transmitted in a first repeated subcarrier S2, a repetition of second symbol 510 (denoted second repeated symbol 512) is transmitted in a second repeated subcarrier S4, and so on, up to a repetition of eighth symbol 515 (denoted eighth repeated symbol 517) is transmitted in an eighth repeated subcarrier S16.

Figure 6:
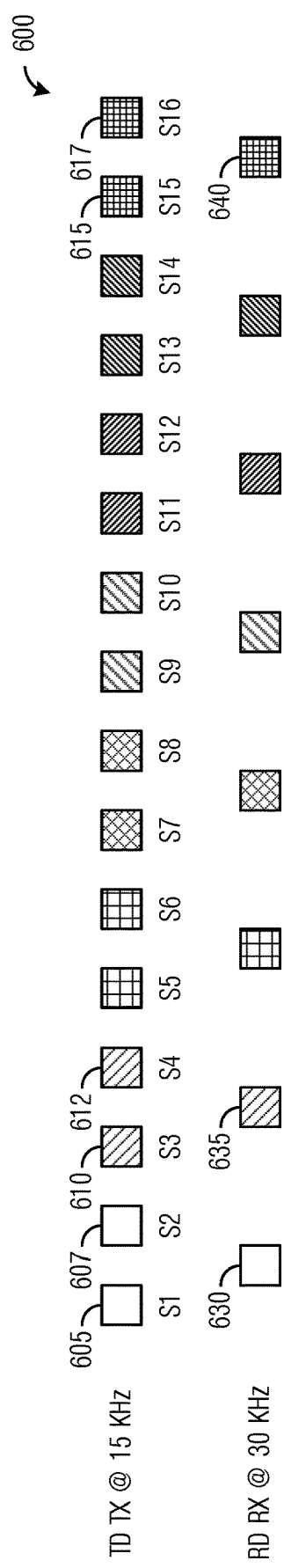
FIG. 6 illustrates a diagram of symbol transmissions by a transmission device in different subcarriers and symbol receptions by a reception device according to example embodiments presented herein.

The repetition of the symbols ensures that if the receiving device uses 30 KHz subcarrier spacing, the receiving device will be able to correctly receive the symbols. As an illustrative example, the receiving of the symbols may be performed using frequency domain detection. Consider an example where the symbol boundary is known as a result of time-frequency synchronization, then a 30 KHz subcarrier spacing (which is twice the original 15 KHz subcarrier spacing used by the transmitting device in transmitting the symbols) can be utilized at the receiving device. Because of the symbol repetition in the frequency domain used by the transmitting device, symbols on two adjacent subcarriers are identical, half rate reception will lead to correct symbol detection. A simple description is as follows: supposed that the symbol to be detected is (+1−j), then the repeating of the (+1−j) symbol on two adjacent subcarriers would result in a detected sample in the 30 KHz subcarrier spacing that is a weighted average of the symbol. As an example, the detected sample may be expressible as:

$$1/2*(+1-j)+1/2*(+1-j)=+1-j,$$

where the two 1/2 values are weights applied to the detected values, the two (+1−j) values that are multiplied by the weights are the detected values of the symbols repeated on the two adjacent subcarriers, and the +1−j to the right of the equality is the symbol detected in the 30 KHz subcarrier spacing as a weighted average FIG. 6 illustrates a diagram 600 of symbol transmissions by a transmission device (TD) in different subcarriers and symbol receptions by a reception device (RD). The symbol transmissions correspond to transmissions made by the TD in a first subcarrier spacing and then each symbol is repeated once in the frequency domain to correspond to a second subcarrier spacing, where the ratio between the second subcarrier spacing to the first subcarrier spacing is two. As shown in FIG. 6, a first symbol 605 is transmitted in a first subcarrier S1, a second symbol 610 is transmitted in a second subcarrier S2, and so on, up to an eighth symbol 615 is transmitted in an eighth subcarrier S15. Furthermore, a repetition of first symbol 605 (denoted first repeated symbol 607) is transmitted in a first repeated subcarrier S2, a repetition of second symbol 610 (denoted second repeated symbol 612) is transmitted in a second repeated subcarrier S4, and so on, up to a repetition of eighth symbol 615 (denoted eighth repeated symbol 617) is transmitted in an eighth repeated subcarrier S16.

Also shown in FIG. 6 are symbols received by the RD using the second subcarrier spacings, including first received symbol 630, second received symbol 635, and so on, up to an eighth symbol 640. Clearly, if the RD is using the first subcarrier spacings, the RD will be able to receive the symbols as transmitted by the TD. Therefore, the receiving device will be able to receive the symbols in either of the two subcarrier spacings.

According to another example embodiment, multiple PSRS sequences are configured and a particular PSRS sequence transmitted by the access node conveys information to the UE. The amount of information that the PSRS sequences is able to convey is Log 2 (number of PSRS sequences). As an example, consider a situation where 4 PSRS sequences are configured, then the access node and the UE agree (or the access node configures the UE to accept) that if the UE detects a first PSRS sequence at a PSRS location, the UE will skip 0 C-DRX cycles (i.e., no C-DRX cycle skipping). Similarly, if the UE detects a second PSRS sequence at a PSRS location, the UE will skip 1 C-DRX cycles; if the UE detects a third PSRS sequence at a PSRS location, the UE will skip 2 C-DRX cycles; and if the UE detects a fourth PSRS sequence at a PSRS location, the UE will skip 3 C-DRX cycles. If the number of PSRS sequences is increased, the UE will be able to skip more C-DRX cycles. As used herein, skipping a C-DRX cycle refers to the skipping of a C-DRX search and PSRS detection prior to the C-DRX. This leads to an overall power saving of 38%, assuming an equal probability of skipping 0, 1, 2 and 3 C-DRX cycles.

In general, the multiple PSRS sequences may be used to represent different ways of monitoring a downlink channel (e.g., the PDCCH) and downlink signals (e.g., the PSRS) to achieve different levels of power consumption reduction. The skipping of a C-DRX cycle may refer to the skipping of a C-DRX search as well as the PSRS occurring before the C-DRX.

The example embodiments presented herein are operable on a side-link communications system configuration and can be a standalone technique for power consumption reduction, between a UE and a smart watch, for example. The example embodiments presented herein are also operable in a cellular communications system configuration involving access nodes and UEs.

FIG. 7A illustrates a flow diagram of example operations 700 occurring in an access node configuring and transmitting PSRSs for reduced power consumption. Operations 700 may be indicative of operations occurring at an access node as the access node configures and transmits PSRSs for reduced power consumption.

Operations 700 begin with the access node configuring a C-DRX mode (including C-DRX-ON and C-DRX-OFF periods) and one or more PSRSs (block 705). The configuration of the periods may include specifying start times, durations, stop times, periods, and so on. The configuration of the one or more PSRSs may include specifying a subcarrier spacing for the one or more PSRSs. In a situation where there are multiple PSRSs, the subcarrier spacing may differ for different PSRSs. The configuration may also include specifying subcarrier spacings for other signals, such as DMRSs of PDCCHs, and so on. The configuration may also include specifying different sequences for each of the one or more PSRSs, along with how a UE will react to detecting different PSRS sequences as it relates to monitoring downlink channels and downlink signals. The access node transmits the configuration (block 707). The access node sends configuration information or indications of configuration information, for example. The access node transmits a PSRS (block 709). The PSRS is transmitted using the specified subcarrier spacing associated with the PSRS. If multiple PSRS sequences are configured, the access node may select a particular PSRS sequence in accordance with how the access node wants the UE to monitor downlink channels and downlink signals. The access node transmits a PDCCH (block 711). The PDCCH may be transmitted with a specified (as specified by a technical standard or an operator of the communications system, for example) subcarrier spacing or a configured (as configured by the access node, for example) subcarrier spacing.

FIG. 7B illustrates a flow diagram of example operations 750 occurring in a UE receiving PSRSs and PDCCHs with reduced power consumption. Operations 750 may be indicative of operations occurring at a UE as the UE receives PSRSs and PDCCHs with reduced power consumption.

Operations 750 begin with the UE receiving a configuration for a C-DRX mode and one or more PSRSs (block 755). The configuration of the periods may include specifying start times, durations, stop times, periods, and so on. The configuration of the one or more PSRSs may include specifying a subcarrier spacing for the one or more PSRSs. In a situation where there are multiple PSRSs, the subcarrier spacing may differ for different PSRSs. The configuration may also include specifying subcarrier spacings for other signals, such as DMRSs of PDCCHs, and so on. The configuration may also include specifying different sequences for each of the one or more PSRSs, along with how a UE will react to detecting different PSRS sequences as it relates to monitoring downlink channels and downlink signals. The UE receives a PSRS (block 757). The PSRS is received in accordance with the subcarrier spacing configured by the access node. The UE receives a PDCCH (block 759). In a situation where the access node configured multiple PSRS sequences, the reception of the PDCCH is in accordance with a configuration of the PSRS sequence received. As an example, depending on the PSRS sequence received by the UE, the UE skips the monitoring of a configured number of C-DRX cycles.

Figures 8A, 8B:
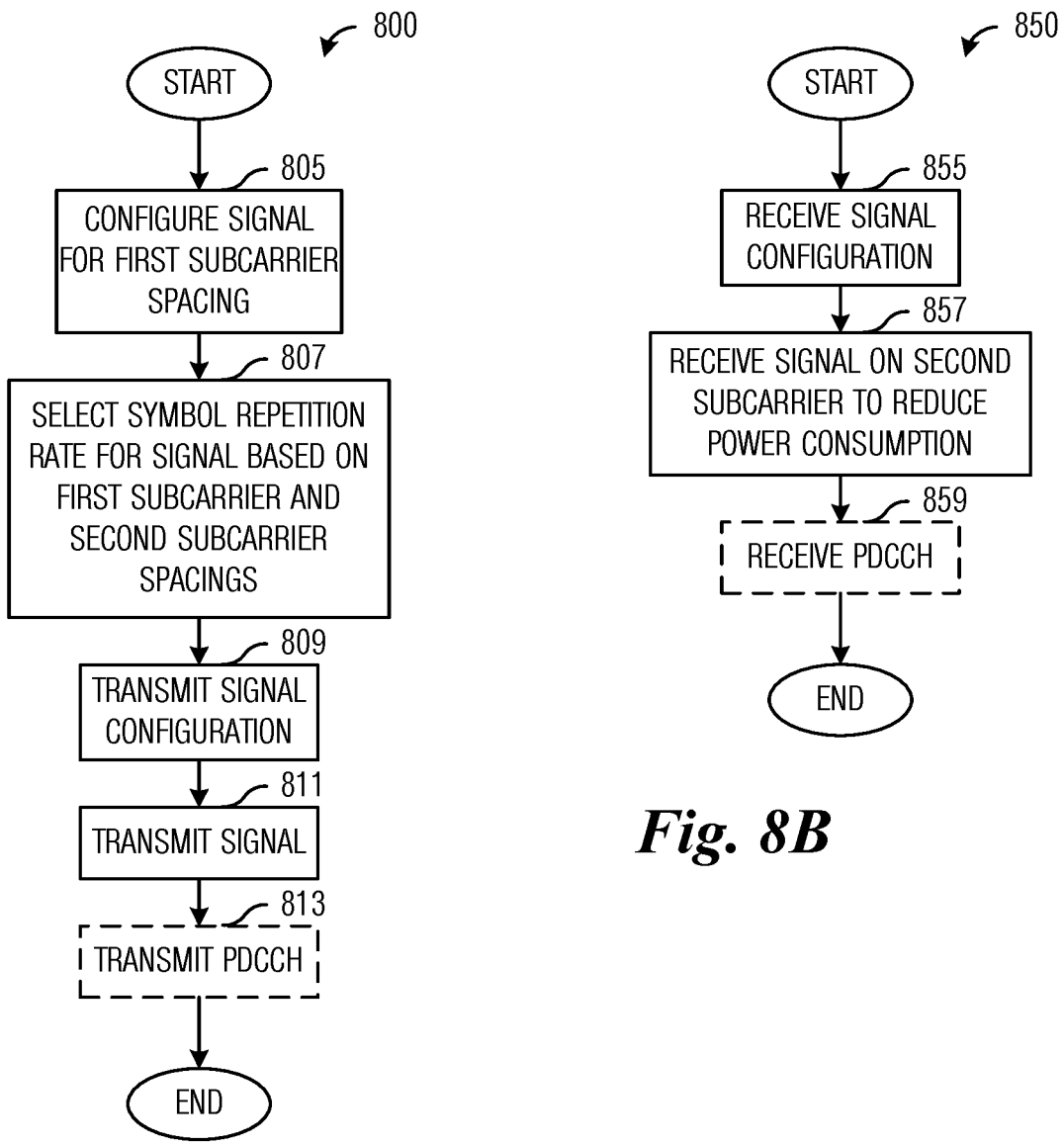
FIG. 8A illustrates a flow diagram of example operations occurring in a transmitting device configuring and transmitting signals in one of multiple available subcarrier spacings to reduce power consumption according to example embodiments presented herein.
FIG. 8B illustrates a flow diagram of example operations occurring in a receiving device receiving signals in one of multiple available subcarrier spacings to reduce power consumption according to example embodiments presented herein.

FIG. 8A illustrates a flow diagram of example operations 800 occurring in a transmitting device configuring and transmitting signals in one of multiple available subcarrier spacings to reduce power consumption. Operations 800 may be indicative of operations occurring in a transmitting device as the transmitting device configures and transmits signals in one of multiple available subcarrier spacings to reduce power consumption.

Operations 800 begin with the transmitting device configuring signals for transmission using a first subcarrier spacing (block 805). The transmitting device selects a symbol repetition rate (block 807). The symbol repetition rate is selected in accordance with a ratio between a second subcarrier spacing and the first subcarrier spacing, where the second subcarrier spacing is an integer multiple of the first subcarrier spacing. The repetition of the symbols allows a receiving device to successfully receive the signal using either the first subcarrier spacing or the second subcarrier spacing. The transmitting device transmits the signal configuration (block 809). The transmitting device transmits the signal (block 811). The transmitting device transmits symbols of the signal and repeated versions thereof in different subcarriers, for example. The symbols are transmitted in subcarriers having the first subcarrier spacing, for example. The transmitting device optionally transmits a PDCCH (block 813).

FIG. 8B illustrates a flow diagram of example operations 850 occurring in a receiving device receiving signals in one of multiple available subcarrier spacings to reduce power consumption. Operations 850 may be indicative of operations occurring in a receiving device as the receiving device receives signals in one of multiple available subcarrier spacings to reduce power consumption.

Operations 850 begin with the receiving device receiving the signal configuration (block 855). The signal configuration may include information about the signal (such as modulation and coding scheme (MCS) information, precoder information, and so on), allocation information (such as the location of the resources conveying the signal, and so forth), subcarrier information (such as subcarrier number, subcarrier bandwidth, subcarrier spacing, etc.), as well as other information. The receiving device receives the signal using the second subcarrier spacing (block 857). Receiving the signal using the second subcarrier spacing reduces the power consumption associated with receiving the signal. The receiving device optionally receives a PDCCH (block 859).

Figure 9:
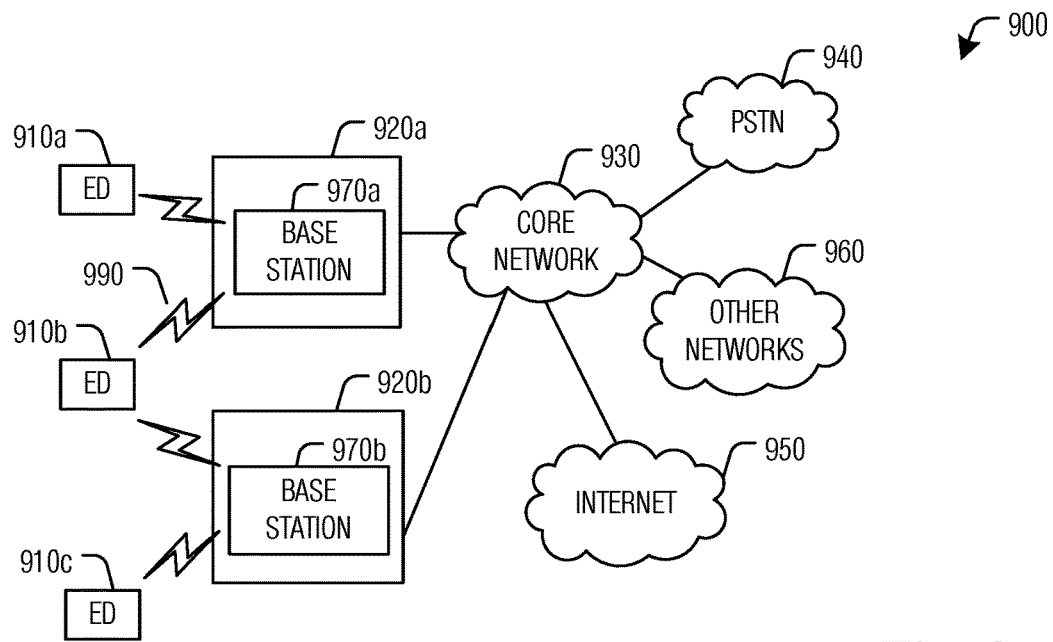
FIG. 9 illustrates an example communication system according to example embodiments presented herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
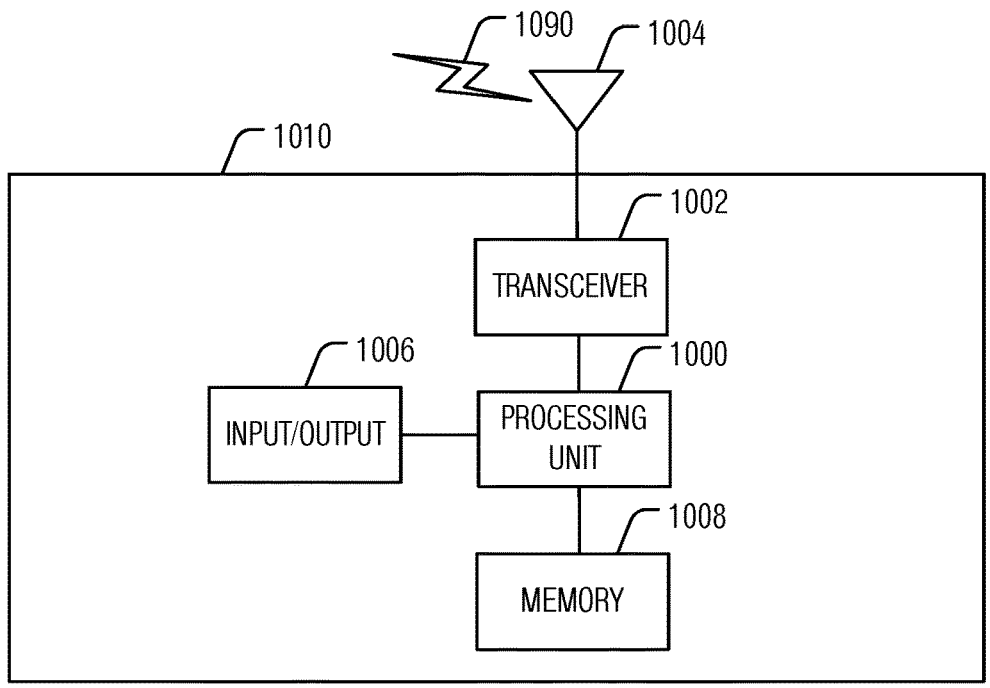
FIGS. 10A and 10B illustrate example devices that may implement the methods and teachings according to this disclosure.
Figure 10B:
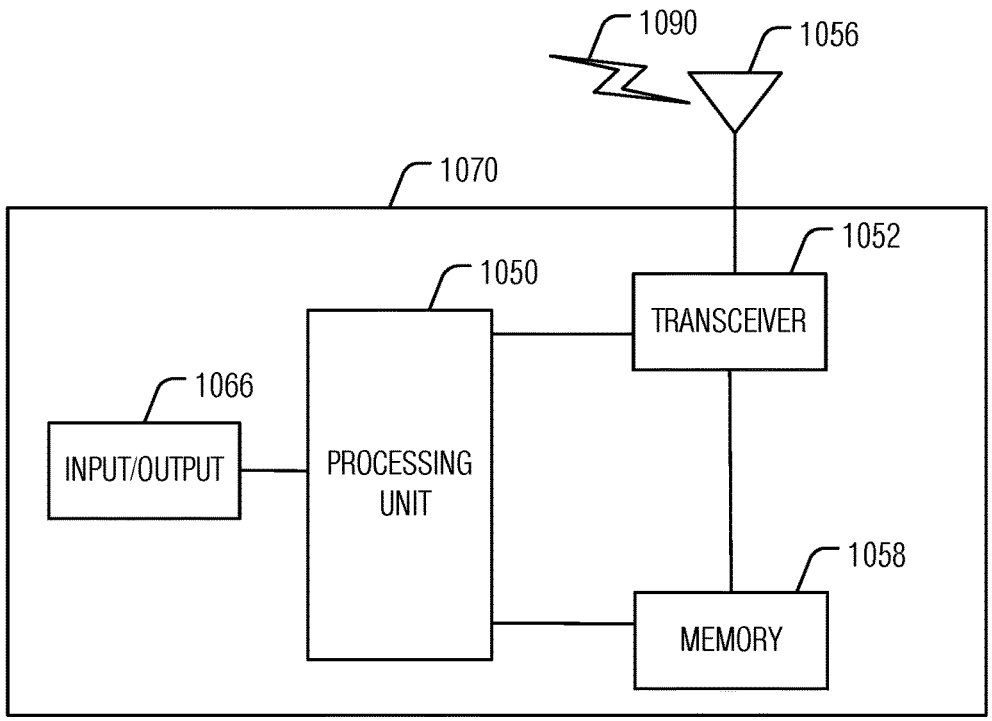

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
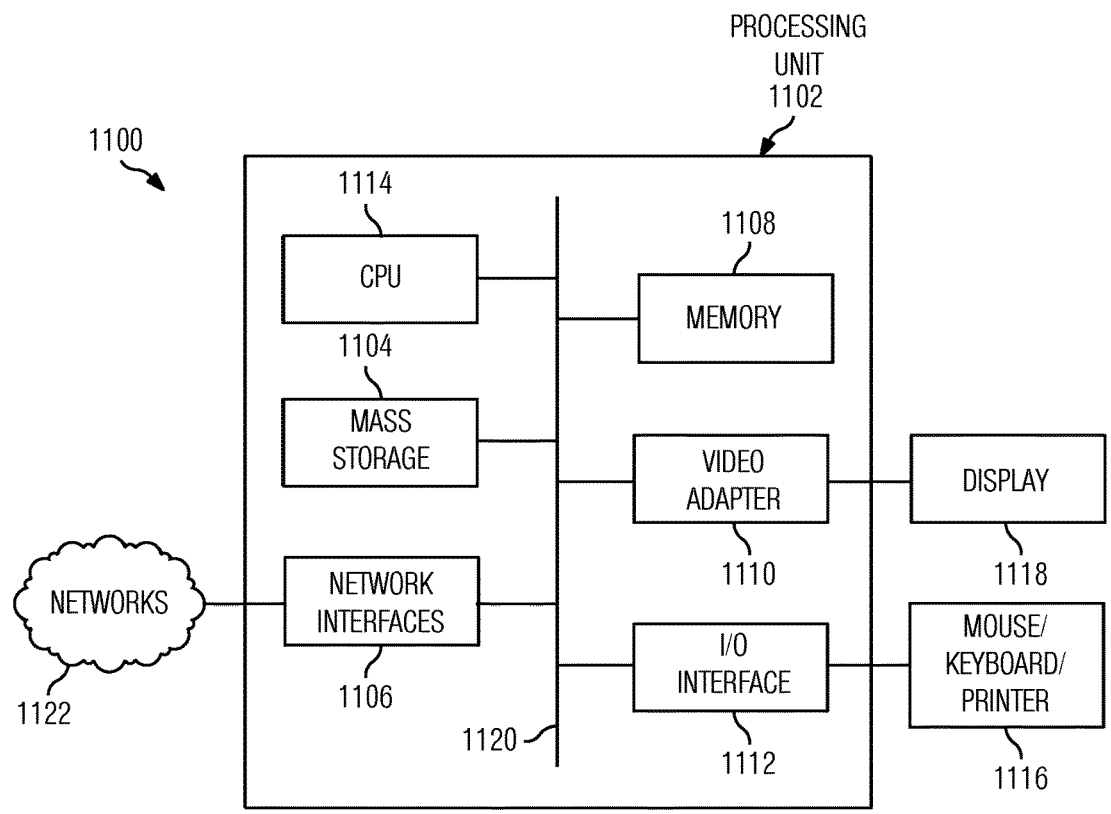
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claim.

What is claimed is:

1. A method implemented by a receiving device (RD), the method comprising:

receiving, by the RD, a configuration for a first reference signal comprising symbols, wherein the first reference signal is configured for transmission by a transmitting device (TD) using a first subcarrier spacing, wherein the symbols of the first reference signal transmitted by the TD are each repeated an integer number of times, wherein the integer number is equal to a ratio of a second subcarrier spacing to the first subcarrier spacing, wherein the second subcarrier spacing is different than the first subcarrier spacing, and wherein the symbols of the first reference signal include a first symbol repeated the integer number of times followed by a second symbol repeated the integer number of times based on the ratio of the second subcarrier spacing to the first subcarrier spacing; and receiving, by the RD, the first reference signal using the second subcarrier spacing.

2. The method of claim 1, wherein the receiving the first reference signal using the second subcarrier spacing comprises:

receiving the first reference signal with a second sampling clock associated with the second subcarrier spacing, wherein the second sampling clock is slower than a first sampling clock associated with the first subcarrier spacing.

3. The method of claim 1, wherein the receiving the first reference signal using the second subcarrier spacing comprises:

receiving the first reference signal with a second Fourier Transform size associated with the second subcarrier spacing, wherein the second Fourier Transform size is smaller than a first Fourier Transform size associated with the first subcarrier spacing.

4. The method of claim 1, wherein the second subcarrier spacing is larger than the first subcarrier spacing.

5. The method of claim 1, further comprising:
receiving, by the RD, a second configuration for a second reference signal, wherein the second reference signal is configured for transmission by the TD using the first subcarrier spacing, and wherein second symbols of the second reference signal are each repeated the integer number of times; and
receiving, by the RD, the second reference signal using the first subcarrier spacing.

6. The method of claim 1, further comprising:
receiving, by the RD, a control channel reference signal using a third subcarrier spacing that is smaller than the second subcarrier spacing.

7. The method of claim 6, further comprising:
receiving, by the RD, a data channel using a fourth subcarrier spacing that is different from the third subcarrier spacing.

8. The method of claim 1, the configuration indicating the first subcarrier spacing used by the TD for transmitting the first reference signal and a sequence for the first reference signal.

9. A method implemented by a transmitting device (TD), the method comprising:
transmitting, by the TD, a configuration for a reference signal comprising symbols, wherein the reference signal is configured for transmission by the TD using a first subcarrier spacing, wherein the symbols of the reference signal are each repeated an integer number of times, wherein the integer number is equal to a ratio of a second subcarrier spacing to the first subcarrier spacing, wherein the second subcarrier spacing is different than the first subcarrier spacing, and
wherein the symbols of the reference signal include a first symbol repeated the integer number of times followed by a second symbol repeated the integer number of times based on the ratio of the second subcarrier spacing to the first subcarrier spacing; and
transmitting, by the TD, the reference signal using the first subcarrier spacing for reception of the reference signal by a receiving device (RD) using the second subcarrier spacing.

10. The method of claim 9, further comprising:
transmitting, by the TD, a control channel using a third subcarrier spacing that is smaller than the second subcarrier spacing.

11. The method of claim 10, further comprising:
transmitting, by the TD, a data channel using a fourth subcarrier spacing that is different from the third subcarrier spacing.

12. A receiving device (RD) comprising:
a non-transitory memory storage comprising instructions; and
one or more processors in communication with the non-transitory memory storage, wherein the one or more processors execute the instructions to cause the RD to perform operations including:
receiving a configuration for a first reference signal comprising symbols, wherein the first reference signal is configured for transmission by a transmitting device (TD) using a first subcarrier spacing, wherein the symbols of the first reference signal transmitted by the TD are each repeated an integer number of times, wherein the integer number is equal to a ratio of a second subcarrier spacing to the first subcarrier spacing, wherein the second subcarrier spacing is different than the first subcarrier spacing, and
wherein the symbols of the first reference signal include a first symbol repeated the integer number of times followed by a second symbol repeated the integer number of times based on the ratio of the second subcarrier spacing to the first subcarrier spacing; and
receive the first reference signal using the second subcarrier spacing.

13. The RD of claim 12, wherein the receiving the first reference signal using the second subcarrier spacing comprises:
receiving the first reference signal with a second sampling clock associated with the second subcarrier spacing, wherein the second sampling clock is slower than a first sampling clock associated with the first subcarrier spacing.

14. The RD of claim 12, wherein the receiving the first reference signal using the second subcarrier spacing comprises:
receiving the first reference signal with a second Fourier Transform size associated with the second subcarrier spacing, wherein the second Fourier Transform size is smaller than a first Fourier Transform size associated with the first subcarrier spacing.

15. The RD of claim 12, wherein the second subcarrier spacing is larger than the first subcarrier spacing.

16. The RD of claim 12, the operations further comprising:
receiving a second configuration for a second reference signal, wherein the second reference signal is configured for transmission by the TD using the first subcarrier spacing, and wherein second symbols of the second reference signal are each repeated the integer number of times; and
receiving the second reference signal using the first subcarrier spacing.

17. The RD of claim 12, the operations further comprising:
receiving a control channel using a third subcarrier spacing that is smaller than the second subcarrier spacing.

18. The RD of claim 17, the operations further comprising:
receiving a data channel using a fourth subcarrier spacing that is different from the third subcarrier spacing.

19. A transmitting device (TD) comprising:
a non-transitory memory storage comprising instructions; and
one or more processors in communication with the non-transitory memory storage, wherein the one or more processors execute the instructions to cause the TD to perform operations including:
transmitting a configuration for a reference signal comprising symbols, wherein the reference signal is configured for transmission by the TD using a first subcarrier spacing, wherein the symbols of the reference signal are each repeated an integer number of times, wherein the integer number is equal to a ratio of a second subcarrier spacing to the first subcarrier spacing, wherein the second subcarrier spacing is different than the first subcarrier spacing, and
wherein the symbols of the reference signal include a first symbol repeated the integer number of times followed by a second symbol repeated the integer number of times based on the ratio of the second subcarrier spacing to the first subcarrier spacing; and transmitting the reference signal using with the first subcarrier spacing for reception of the reference signal by a receiving device (RD) using the second subcarrier spacing.

20. The TD of claim 19, the operations further comprising:

transmitting a control channel using a third subcarrier spacing that is smaller than the second subcarrier spacing.

21. The TD of claim 20, the operations further comprising:

transmitting a data channel using a fourth subcarrier spacing that is different from the third subcarrier spacing.

* * * * *